US006676887B2

United States Patent
Lafdi (10) Patent No.: US 6,676,887 B2
(45) Date of Patent: Jan. 13, 2004

(54) OXIDATION RESISTANT CARBON COMPOSITES WITH IMPROVED FRICTION PERFORMANCE AND METHODS FOR MAKING AND USING THEM

(75) Inventor: Khalid Lafdi, Carbondale, IL (US)

(73) Assignee: Board of Trustees of Southern Illinois University, Carbondale, IL (US)

(*) Notice: Subject to any disclaimer, the term of this patent is extended or adjusted under 35 U.S.C. 154(b) by 143 days.

(21) Appl. No.: 09/778,407

(22) Filed: Feb. 7, 2001

(65) Prior Publication Data

US 2002/0106514 A1 Aug. 8, 2002

(51) Int. Cl.[7] ............................................. C04B 35/64
(52) U.S. Cl. ...................... 264/683; 264/29.5; 264/605; 264/620; 264/653; 264/656; 264/664; 264/662
(58) Field of Search .................... 428/449, 408, 428/698, 704, 697, 699; 264/29.5, 683, 29.7, 605, 620, 653, 656, 662, 664, 628

(56) References Cited

U.S. PATENT DOCUMENTS 3,719,452 A * 3/1973 Accountius ................. 428/449
5,298,311 A * 3/1994 Bentson et al. ............. 428/216

* cited by examiner

Primary Examiner—Merrick Dixon
(74) Attorney, Agent, or Firm—Thompson Coburn, LLP (57) ABSTRACT

An oxidation resistant carbon composite material comprises nanocrystalline silicon carbide regions distributed throughout a carbon matrix. The composite is prepared by intermixing in a solvent a silicon carbide precursor and a carbon precursor and forming a solution that is free of solids. After removing the solvent from the mixture, the remaining material is pyrolyzed and forms the characteristic nanocrystalline silicon carbide in a carbon matrix. A composite made by the subject method and a part made from the composite are also provided.

34 Claims, 6 Drawing Sheets

OXIDATION RESISTANT CARBON COMPOSITES WITH IMPROVED FRICTION PERFORMANCE AND METHODS FOR MAKING AND USING THEM

BACKGROUND OF THE INVENTION

1. Field of the Invention

The present invention relates to carbon composite materials, and more particularly to carbon composite materials that include silicon carbide and have improved oxidation resistance and carbon friction performance in humid environment.

2. Description of Related Art

It is well known that carbon-carbon composites possess excellent mechanical properties at high temperatures, as well as having a low coefficient of thermal expansion and a high thermal conductivity. See, e.g., Rubin, L., in *Carbon-carbon materials and composites*, Buckley et al., Eds., p.267, Noyes Publ., NJ (1993); Fitzer et al., in *Petroleum derived carbons*, Bacha et al., Eds., p.346, American Chemical Society (1986); Sheehan, J., in *Carbon-carbon materials and composites*, Buckley et al., Eds., p.223,Noyes Publ., NJ (1993); and Fitzer, E., *Carbon*, 25:163 (1987). Such properties make these materials attractive for such uses as airframe structures, aerospace engines and brake components. One drawback, however, is that carbon is oxidized in air at temperatures as low as 400° C., and in some applications, even a small amount of carbon oxidation can compromise the utility of a carbon-carbon composite part. Since carbon composite materials hold such great promise as materials of construction for demanding applications, a great deal of research has been focused on the development of methods to improve their oxidation resistance. See, e.g., Sheehan, J., *Carbon*, 27(5):709 (1989).

Previous efforts to improve the oxidation resistance of carbon-carbon composite materials have been directed to two major areas. One area of research has centered around the application of oxidation-resistant coatings, such as silicon carbide, to block oxygen contact with the oxidation-prone carbon. This work has been discussed by Sheehan, in *Carbon-carbon materials and composites*, Buckley et al., Eds., p.223, Noyes Publ., NJ (1993); Strife et al., *Ceramics Bulletin*, 67(2):369 (1988); Wu et al., *Carbon*, 29(8):1257 (1991); and in U.S. Pat. Nos. 4,668,579, 4,671,997, 5,298,311, 5,380,556, 5,536,574, 5,736,232, and 5,752,773 among others. The major problem with the use of coatings is that the coatings usually induce stresses in the fabricated part due to the different coefficient of thermal expansion of the coating material and the carbon composite. This often leads to crack formation. See, Sheehan, J., *Carbon*, 27(5):709 (1989). It has been reported that such cracks can be minimized, or sealed, if the protective coating is used in conjunction with another layer—for example, a glass coating—which can seal the cracks as they develop. See, e.g., Sheehan, in *Carbon-carbon materials and composites*, Buckley et al., Eds., p.223, Noyes Publ., NJ (1993); and Liu et al., *J. Mater. Sci. Lett.*, 12(12):886 (1993). But, such additional coatings can be expensive to apply and require more complex fabrication techniques. Moreover, if even a small crack remains unsealed, oxidation that is initiated at that point can severely damage the overall integrity of the carbon composite part.

The other general method for protecting carbon composites is the use of matrix inhibitors, such as boron or boron carbide. These materials reduce carbon oxidation by spreading a sealant—borate glass—within the composite. See, e.g., Sheehan, id. at p.223, as above; and Liu, id., as above. It has been shown, however, that because of their relatively low melting point, such inhibitors introduce temperature limitations for composite applications and are effective only after an appreciable fraction of carbon has been gasified. See, e.g., Fitzer, E., *Carbon*, 25:163 (1987); McKee, D. W., *Carbon* 26(5):659 (1988); Sheehan, J., *Carbon*, 27(5):709 (1989); Strife et al., *Ceramics Bulletin*, 67(2):369 (1988); and Wu et al., *Carbon*, 29(8):1257 (1991). This is unacceptable in certain applications, since as little as a few percent of weight loss can drastically reduce the mechanical properties of the composite.

Other methods for the protection of carbon composites include the addition of oxidation resistant materials such as polycrystalline silicon carbide particles (Chin, A., et al., *Proc. Mater. Res. Soc.*, Boston, Mass., p.106, Nov. 28 (1994)), and chemical vapor infiltration (CVI) is often used for this purpose. However, the structure that is produced is prone to crack formation due to the different coefficients of thermal expansion of the carbon and the relatively large polycrystalline silicon carbide particles.

Another study reported the formation of crystalline silicon carbide from silicon carbide precursors in association with carbon precursors. Kawamura et al., in *Carbon*, 30(3):429 (1992), reported that silicon carbide/carbon composite sheets that were produced from a silicon-containing polymer and heat-treated coal tar pitch gave promising results in terms of oxidation resistance and mechanical strength. However, the study was limited to the formation of silicon carbide/carbon composites from mixtures or emulsions of finely ground solid precursors which gave composites having weight ratios of silicon carbide-to-carbon matrix material of over 1.5/1.

Several studies have reported the properties of carbon/silicon carbide/carbon composites that were prepared by CVI techniques. However, it was found that the silicon carbide that formed in the matrix was polycrystalline, and, as mentioned above, such polycrystalline regions can induce mechanical stresses during thermal cycling. The composites that were prepared by CVI with co-deposition of silicon carbide with carbon exhibited a lower oxidation rate (Kim, et al., *Carbon*, 31 (7):1031 (1993)), and similar or improved mechanical properties as compared with pure carbon-carbon composites (Park, et al., *Carbon*, 30(6):939 (1992)).

These studies underscore the positive role of silicon carbide within the carbon matrix on improving the oxidation resistance of carbon/carbon composite materials. However, presently available carbon composites containing silicon carbide at levels that improve oxidation resistance often sacrifice strength and resistance to thermal stress. Accordingly, there is a need for carbon-carbon composite materials that demonstrate improved oxidation resistance at higher temperatures—and in particular an oxidation resisting effect that is not limited to the surface, but is distributed throughout the bulk of the composite; and also for such a material that sacrifices a minimum amount of physical strength and resistance to thermal stress at such higher temperatures; and also for such a material that could be easily fabricated without the need for multiple-step fabrication processes, or the application of costly protective coatings and the like.

When carbon composite materials are used in braking systems, or other applications wherein friction is an important property in determining performance, another problem has been the effect that oxygen and moisture can have upon the coefficient of friction of the composite material. It has been found that the coefficient of friction of carbon-carbon materials can be significantly reduced by the presence of condensable vapors, and that when such vapors are present, some form of lubricating film can be formed on the surface of the carbon material. (See, e.g., Earp, F. K., *The Industrial Chemist*, p. 495 (Oct. 1961); Ramadanoff, D., and S. W. Glass, *Trans. AIEE*, 6__:825 (1944); Campbell, W. E., and R. KoZak, *Trans. AIEE*, 70:491 (1948); Zaidi, H. et al., *Appl. Surf. Sci.*, 44:221 (1990); and Yen, B. K., *J. Mater. Sci. Let.*, 14:1481 (1995)). Thus, the presence of moisture in contact with a carbon-carbon brake surface can reduce the effectiveness of the brakes very significantly, and as little as the amount of water vapor present in the air can be sufficient to cause this effect. Some braking systems even have to be heated to prevent the presence of moisture.

Accordingly, it would be useful to provide a carbon composite material that not only would have advantageous oxidation resistance without sacrificing strength, as described above, but would also be less susceptible to the lubricating effects of moisture.

BRIEF SUMMARY OF THE INVENTION

Briefly, therefore, the present invention is directed to a novel oxidation resistant carbon composite material comprising nanocrystalline silicon carbide regions distributed throughout a carbon matrix.

The present invention is also directed to a method for preparing an oxidation resistant carbon composite material comprising forming a solids-free solution of a silicon carbide precursor and a carbon precursor in a solvent; removing the solvent; and pyrolyzing the material remaining after removing the solvent, thereby forming nanocrystalline silicon carbide in a carbon matrix.

The present invention is also directed to a novel method for preparing an oxidation resistant carbon composite material comprising intermixing in a solvent a silicon carbide precursor and a carbon precursor and forming a solution that is free of solids; removing the solvent; and pyrolyzing the material remaining after removal of the solvent, thereby forming nanocrystalline silicon carbide in a carbon matrix.

The present invention is also directed to a novel oxidation resistant carbon composite material that has been prepared by mixing a silicon carbide precursor with a carbon precursor in a solvent to form a solution that is free of solids; removing the solvent; and pyrolyzing the material remaining after removal of the solvent, thereby to form silicon carbide in a carbon matrix.

The present invention is also directed to a part that comprises a novel oxidation resistant carbon composite material comprising nanocrystalline silicon carbide regions distributed throughout a carbon matrix.

Among the several advantages found to be achieved by the present invention, therefore, may be noted the provision of a carbon-carbon composite material that demonstrates improved oxidation resistance at higher temperatures—and in particular an oxidation resisting effect that is not limited to the surface, but is distributed throughout the bulk of the composite; the provision of such a material that sacrifices a minimum amount of physical strength and resistance to thermal stress at such higher temperatures; the provision of such a material that could be easily fabricated without the need for multiple-step fabrication processes, or the application of costly protective coatings and the like; and the provision of such a material that is less susceptible to the lubricating effects of moisture.

DETAILED DESCRIPTION OF THE INVENTION

In accordance with the present invention, it has been discovered that a carbon composite material that is surprisingly resistant to oxidation at high temperatures can be produced by mixing a silicon carbide precursor and a carbon precursor in a solvent to form a solution that is free from solids; removing the solvent; and then pyrolyzing the material that remains after the removal of the solvent to obtain the subject carbon composite material. The resulting carbon composite material has a novel structure featuring a carbon matrix with nanocrystalline silicon carbide regions (as those terms are defined below) that are distributed throughout the carbon matrix. If it is desired, other materials such as carbon fibers can also be a component of the novel composite material to enhance desirable properties, such as strength and durability. In addition to demonstrating high resistance to oxidation, the novel carbon composite material also maintains mechanical strength and is surprisingly free of thermal stress at high temperatures.

As will be discussed in detail below, an important feature of the present invention is the preparation of a solution of the silicon carbide precursor and the carbon precursor in a common solvent. The solution is made free of solids and the silicon carbide precursor and the carbon precursor are uniformly intermixed before the solvent is removed. After removal of the solvent, the intimate mixture of the silicon carbide precursor and the carbon precursor—with or without the addition of carbon fibers—can be formed into a desired shape and pyrolyzed to form the novel oxidation resistant carbon composite material of the present invention. It is believed that the intimate intermixture of the silicon carbide precursor and the carbon precursor that is obtained in a solids-free solution causes the formation during pyrolysis of the novel nanocrystalline silicon carbide regions that are distributed throughout the carbon matrix.

The silicon carbide precursor material of the present invention can be any material that forms silicon carbide upon pyrolysis at 800° C., or above. Silicon containing organic polymers are useful silicon carbide precursors. Examples of silicon containing organic polymers that are useful as silicon carbide precursors include polycarbosilane (PCS), and its derivatives, such as, polycarbostyrenesilane, polycarbovinylsilane, polycarbodimethylsilane, and the like; polysilizane (PCSZ), and its derivatives, such as, polyvinylsilizane, polysilalazane (PSSZ), and the like; and polycarboxysilicones, such as polysiloxane, and the like.

A preferred silicon carbide precursor is polycarbosilane. Polycarbosilane can be obtained commercially, or it can be produced from polydimethylsilane as described, for example, by Kawamura et al., in *Carbon*, 30(3):429 (1992).

The carbon precursor of the present invention can be any material that can be transformed into a high-strength carbon product upon carbonization (pyrolysis). As used herein, the terms "carbonization" and "pyrolysis" are used interchangeably and mean the transformation of a compound into one or more other substances by heat alone, i.e., without oxidation. Thus, carbon precursors that are useful in the present invention include, without limitation, pitch, such as isotropic pitch (petroleum pitch A-70 or A-80), mesophase and mesogenic pitch (such as obtained according to ASTM D4616, and as are available from Mitsubishi and Maruzen), coal tar pitch; resins, such as furans, phenolics, polyimides, polybenzimidazole, polyphenylene, biphenolic resins, novolac, novax, polyacrylonitrile, and the like; polyacetanaphthalene, polydecacylene, and other organic polymers having as a major part aromatic materials with a melting point less than about 400° C.; heavy fractions of coal and petroleum products such as quinoline insoluble (QI) fractions, such as those obtained according to ASTM D-2318 and ASTM D-4746, and toluene insoluble (TI) fractions, such as those obtained according to ASTM D4072 and ASTM D-4312, and Beta resins, such as those obtained according to ASTM D-5294. Petroleum and coal tar pitches are more preferred; and petroleum pitch is even more preferred.

Pitches, such as petroleum pitch or coal tar pitch are composed of a complex mixture of alkyl substituted poly- condensed aromatics of high molecular weight and a high degree of aromatic ring condensation. The microstructure of the carbon product that is produced by pyrolyzing pitch, or any other carbon precursor, depends to a great degree upon the type of pitch, or other material, that is used, and can vary from a highly ordered anisotropic carbon structure to an unordered or random isotropic structure. That part of the carbon composite of the present invention that is the product of pyrolysis of the carbon precursor is termed the "carbon matrix".

When pitch is used as the carbon precursor, it is useful to be able to characterize it in terms of some easily measured characteristics. Many types of pitches can be produced by varying the aromatic feedstock materials and the processes used in pitch manufacture. One simple method to characterize these pitches is by the use of solvent analysis, for example, the degree of solubility/insolubility in benzene, toluene, pyridine, quinoline, anthracene, or other solvent. For the purpose of the present invention, pitches can be characterized by their solubility/insolubility in toluene and benzene.

Solvent analysis is a method that is used universally to define the type and composition of various pitches, and the quantitative determination of pitch insolubles in toluene and benzene are two analytical protocols that have become standard in the industry. For example, benzene insolubles can be determined by ASTM D-2317 (American Society for Testing and Materials), and toluene insolubles can be measured by ASTM D-4072 and ASTM D-4312. These two fractions represent major fractions of pitch that vary, for example, in molecular weight, aromaticity, degree of aromatic ring condensation and coking characteristics.

As used herein, the weight fraction of a pitch that is soluble in toluene under the conditions of the toluene solubility test protocol identified above is referred to herein as the "gamma" fraction of the pitch. The weight fraction of the pitch that remained insoluble during removal of the gamma fraction, but is soluble in benzene under the conditions of the benzene solubility test protocol identified above is referred to herein as the "beta" fraction of the pitch. The fraction of the pitch that remains insoluble after the removal of the gamma and the beta fractions is referred to herein as the "alpha" fraction of the pitch.

For the reasons that will become apparent below, it has been found that pitches having high levels of the beta fraction and low levels of the alpha fraction are preferred for use in the present invention.

The solvent that is used in the present invention can be any solvent in which both the silicon carbide precursor and the carbon precursor are soluble. The solvent must be of a type that is a liquid at a temperature and pressure at which the silicon carbide precursor and the carbon precursor are soluble therein in order to permit intimate intermixing of the dissolved solutes. It is preferred that the solvent be one that can be separated or removed from the dissolved silicon carbide precursor and carbon precursor. When it is said that the silicon carbide precursor is soluble in the solvent, what is meant is that all or a part of the silicon carbide precursor dissolves in the solvent to form a solution. It is preferred that the silicon carbide precursor is soluble in the solvent in an amount of at least about 10 g/l at 80° C.; more preferably at least about 25 g/l; even more preferably at least about 50 g/l; and yet more preferably at least about 100 g/l. When it is said that the carbon precursor is soluble in the solvent, what is meant is that all or a part of the carbon precursor dissolves in the solvent to form a solution. It is preferred that the carbon precursor is soluble in the solvent in an amount of at least about 10 g/l at 80° C.; more preferably at least about 25 g/l; even more preferably at least about 50 g/l; and yet more preferably at least about 100 g/l.

When it is said that all or a part of the carbon precursor and the silicon carbide precursor dissolve in the solvent to form a solution, the term "solution" is not meant to include dispersions, suspensions or emulsions of the precursors in the solvent. However, it should be understood that when the precursors are intermixed with the solvent, some part of one or both of them may not go into solution, while another part will go into solution. The invention also includes such a solution after it has been made free of the insoluble fractions of the components, such as by filtration or centrifugation.

It has been found that organic solvents that have certain ranges of solubility parameter (as that term is defined on p. C-720 of the *Handbook of Chemistry and Physics,* 56th Ed., R. C. Weast, Ed., CRC Press, Cleveland, Ohio) and certain ranges of normal boiling point are useful as the solvent of the present invention. The preferred solvent is an organic solvent having a solubility parameter between 8.0 and 11.0 Hildebrand units and a normal boiling point of less than 345° C.; more preferred is an organic solvent having a solubility parameter between 8.0 and 11.0 Hildebrand units and a normal boiling point of less than 240° C.; even more preferred is an organic solvent having a solubility parameter between 8.0 and 11.0 Hildebrand units and a normal boiling point of less than 150° C.; and yet more preferred is an organic solvent having a solubility parameter between 8.0 and 9.5 Hildebrand units and a normal boiling point of less than 150° C. Even more preferred solvents can be selected from benzene, toluene, pyridine, xylene, anthracene, quinoline, or mixtures thereof; and toluene is yet more preferred for use as the solvent. It should also be understood that the solvent of the present invention can be any of the solvents described above alone, or can also be any two or more of such solvents in a mixture.

It should also be understood that in some pitches, one or more components of the gamma fraction (toluene solubles) can act as the subject solvent. Thus, it is believed that a pitch having a large gamma fraction of suitable composition could act, not only as the carbon source, but also as the solvent.

It may be desirable to have other materials as components of the carbon composite of the present invention in order to enhance certain properties. For example, carbon fibers can enhance the mechanical strength of the composition. If carbon fibers are used as a component of the subject composite, they can be any type of fibers that pass in the trade as "carbon fibers". Further information about such fibers can be found in U.S. Pat. Nos. 4,576,810, 4,590,055, 4,600,496, 4,603,042, 4,610,860, and 4,670,129, among others.

Other materials that may be used as components of the subject carbon composite include, without limitation, boron nitride, boron carbide, boron glasses, boron oxides, zirconium, hafnium, tantalum, titanium carbides and titanium oxides, among others.

The carbon composite of the present invention can be produced by intermixing the silicon carbide precursor and the carbon precursor in a solvent and forming a solution that is free of solids. The solvent is then removed from the mixture, leaving an intimate intermixture of the precursors. This intermixture can then be pyrolyzed to form the nanocrystalline silicon carbide regions uniformly dispersed throughout a carbon matrix that is characteristic of the composite of the invention.

The solution of the silicon carbide precursor and the carbon precursor—along with any other ingredients that are to be components of the composite, or are added to facilitate its production—can be made up by any method that is commonly used in the art for the preparation of a solution from solid or semi-solid materials in a liquid solvent. For example, the solvent can be heated with stirring to some temperature that is above ambient, but below its normal boiling point, and the carbon precursor and the silicon carbide precursor can be added to the solvent and permitted to dissolve. It is preferred that the precursors, and all other ingredients that are to become components of the carbon matrix, are completely dissolved in the solvent. However, if some of the precursors or other components remain undissolved, the insoluble portion can be removed from the solution by filtration or centrifugation.

If filtration is used to remove the insoluble portion of the ingredients, simple vacuum filtration through, for example, a 20 micron filter can be used to remove the insolubles. It is preferred that such filtration be through a 10 micron filter. The filter media can be almost any material that is compatible with the solvent, and common filter paper is suitable.

The inventor believes that providing a solution of the silicon carbide precursor and the carbon precursor that is free of undissolved particles of either the silicon carbide precursor or the carbon precursor prior to pyrolysis of the material is one feature that contributes to the formation of the characteristic nanocrystalline silicon carbide structure of the subject composite. Without wishing to be bound by this or any other theory, the inventor believes that the uniform dispersion of the silicon carbide precursor throughout the carbon precursor that is accomplished in the well mixed solids-free solution permits the precursors to remain intermixed, but without any crystal interfaces (which might catalyze further premature crystal growth of silicon carbide) while the solvent is removed. The crystal-free, intimate mixture of the precursors can then be pyrolyzed with the result that a great number of tiny—nanometer-sized—regions of silicon carbide will form at the same time as the carbon matrix begins to cross-link. Silicon carbide crystals will form in some of these regions of silicon carbide, but other silicon carbide regions will remain amorphous, and such amorphous regions are also included when "nanocrystalline silicon carbide regions" are referred to. As a result of the intimate intermixture of the precursors, it is believed that the nanocrystalline silicon carbide regions are distributed uniformly throughout the carbon matrix. Because the silicon carbide precursor is used at a reasonably low level relative to the carbon precursor (as will be discussed below) and has been intermixed at a molecular level with the carbon precursor, the nanocrystalline silicon carbide regions predominantly contain at most only one single crystal of silicon carbide and do not contain any interfaces between silicon carbide crystal surfaces. Thus, the nanocrystalline silicon carbide regions are said to be free of intergranular silicon carbide interfaces. In contrast, in a carbon composite material having "polycrystalline" silicon carbide regions, regions containing silicon carbide can have two or more crystals of silicon carbide, which can intersect at intergranular interfaces. Such intergranular interfaces are believed to be sites of enhanced chemical activity and it is thought that their presence increases the susceptibility of the composite to reaction with, for example, oxygen. Moreover, it is believed that the intergranular interfaces can act as stress relief points in the composite material and increase the danger of thermal stress cracking, for example.

The term "region", as used herein, means an increment of volume within the subject composite within which a particular material predominates. Thus, a "silicon carbide region" is an increment of volume within the subject composite within which silicon carbide predominates.

It is preferred that at least 50% of the nanocrystalline silicon carbide regions of the subject composite comprise no more than one silicon carbide crystal; more preferred that at least 75% of the nanocrystalline silicon carbide regions comprise no more than one silicon carbide crystal; even more preferred that at least 90% of the nanocrystalline silicon carbide regions comprise no more than one silicon carbide crystal; and most preferred that substantially all of the nanocrystalline silicon carbide regions comprise no more than one silicon carbide crystal.

The average nominal size of the nanocrystalline silicon carbide regions of the subject composite are about 8–10 nm with 90% of the silicon carbide regions being less than about 40 nm in nominal size. When the "average size" of the nanocrystalline silicon carbide regions of the subject composite is referred to, what is meant is the arithmetic average nominal diameter of a representative sample number of the total silicon carbide regions that are present in a composite. The average size of the silicon carbide regions can be larger or smaller than 8–10 nm depending upon the weight ratio of the silicon carbide precursor and the carbon precursor. However, at any value of the weight ratio of the silicon carbide precursor and the carbon precursor, the nominal size of the nanocrystalline silicon carbide regions of the subject composite will be of an average size of below about 100 nm, preferably below about 50 nm, more preferably below about 25 nm, and even more preferably below about 10 nm.

Figure 2:
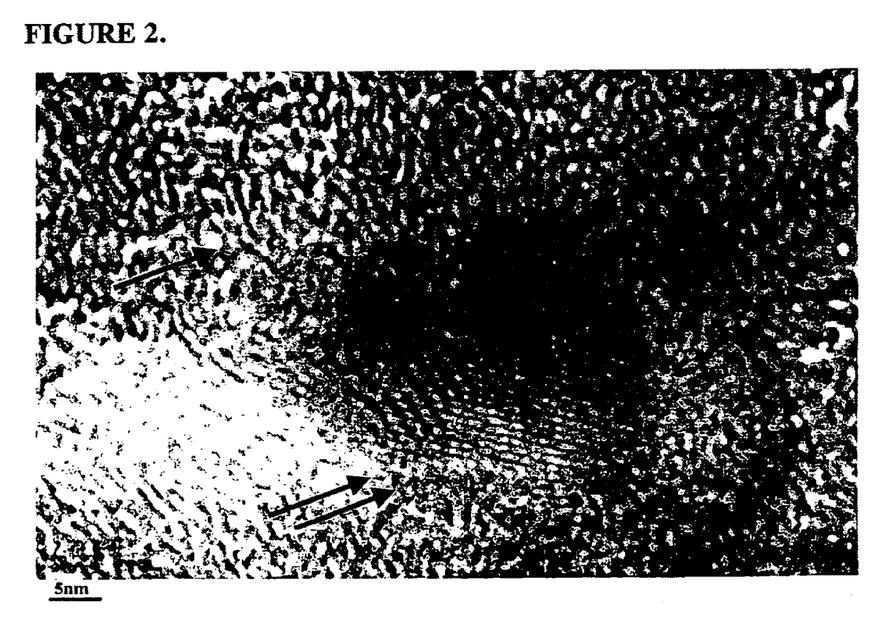
FIG. 2 is a transmission electron micrograph of a cross-section taken from a 30/70 by weight PCS/pitch carbon composite according to the present invention showing turbostratic carbon formations typical of the carbon matrix (single arrow) and a larger and a smaller silicon carbide region (dark regions indicated by double arrow) with the larger of the silicon carbide regions showing straight parallel lines indicative of a single silicon carbide crystal and also showing an indistinct boundary between the crystalline and the non-crystalline silicon carbide regions and the carbon matrix that is distinctive for the composite of the present invention.

It is also believed that the novel method of preparing the subject carbon composite results in the formation of nanometer-sized silicon carbide regions that have no clear interface with the carbon matrix. This property can be explained with reference to FIG. 2, for example, where a larger and a smaller nanocrystalline silicon carbide regions are shown embedded in a surrounding carbon matrix. It is believed to be distinctive of the silicon carbide regions of the present invention that they have no abrupt interfacial discontinuities between the silicon carbide and the carbon matrix, but rather seem to gradually transition from being predominantly silicon carbide, to being predominantly carbon over a finite distance. In the photomicrograph of FIG. 2, it appears that this transition distance may be approximately 1–8 nm. It is preferred that the transition distance range from about 2 nm to about 6 nm, more preferred that it range from about 2 nm to about 4 nm. It is expected, however, that such distance can vary from region to region and even over the boundaries of each region. However, the inventor believes that the provision of such graduated region boundaries—as opposed to interfacial discontinuities, such as are present when undissolved crystalline silicon carbide powder is used as a source of silicon carbide—provide the subject composite with significantly fewer weak points in the microstructure.

It is believed that the characteristic structure that is described herein as "nanocrystalline silicon carbide regions distributed throughout a carbon matrix" is important to the achievement of the various advantages of the subject composite, such as superior oxidation resistance, while maintaining high strength and low internal stress at high temperatures.

Since it is desirable to control the relative amounts of silicon carbide and carbon matrix in the finished composite (which may be referred to as the SiC/C weight ratio), it is useful to control the relative amounts of silicon carbide precursor and carbon precursor that are added to the solution. It is also preferable to know the yield of silicon carbide and carbon that are to be expected after pyrolysis of the silicon carbide precursor and the carbon precursor, respectively. For example, when polycarbosilane (PCS) is used as the silicon carbide precursor, the yield of silicon carbide (SiC) is from about 65% to about 75% by weight of the original PCS that is originally present in the blend. To determine the yield more precisely, the other components of the blend must be known and the conditions of pyrolysis must be defined. However, it is a simple matter for one of skill in the art to determine the yield of each component by simple testing prior to using the subject method to produce subject composites for actual applications.

It has been found to be preferred that the silicon carbide precursor and the carbon precursor are placed into solution in relative amounts suitable to obtain the final SiC/C weight ratios that will be described in more detail below. However, when PSC is the silicon carbide precursor and petroleum pitch having a yield of about 35% by weight is the carbon precursor, it is preferred that the PCS/pitch weight ratio in the solution is less than about 50/50. It is more preferred that the PCS/pitch weight ratio in the solution is about 40/60, or lower; even more preferred that it is between about 40/60 and about 20/80; even more preferred that it is between about 35/65 and about 25/75; and yet more preferred that it is about 30/70, on a weight basis.

The relative amounts of silicon carbide precursor and carbon precursor that are present in the solution can also be expressed in terms of the relative amounts of silicon carbide and carbon that each will yield upon pyrolysis. Thus, it is preferred that the relative amounts of the silicon carbide precursor and the carbon precursor that are present in the solution are sufficient to result in a composite material after pyrolysis having a silicon carbide-to-carbon matrix weight ratio of less than 60/40; more preferred that the relative amounts are sufficient to result in a composite material after pyrolysis having a silicon carbide-to-carbon matrix weight ratio of less than 50/50; even more preferred that the relative amounts are sufficient to result in a composite material after pyrolysis having a silicon carbide-to-carbon matrix weight ratio of between about 25/75 and 50/50; yet more preferred that the relative amounts are sufficient to result in a composite material after pyrolysis having a silicon carbide-to-carbon matrix weight ratio of between about 33/67 and 43/57; and most preferred that the relative amounts are sufficient to result in a composite material after pyrolysis having a silicon carbide-to-carbon matrix weight ratio of between about 35/65 and 40/60.

It should be understood that when the silicon carbide/carbon matrix weight ratio is calculated, the weight of the carbon fibers or any other carbon component that is placed in the composite, or which the carbon composite is used to impregnate, is not to be included in the weight of the carbon matrix. The carbon matrix is derived from the carbon precursor material, and it is the amount of carbon that remains from the carbon precursor after pyrolysis that determines the weight of the carbon matrix.

After the solution of the silicon carbide precursor and the carbon precursor is mixed to uniformity (for example, about 10–20 minutes of moderate-shear mixing, such as with a turbine agitator at moderate-to-high speed) and any insoluble materials have been removed, the solvent is then removed from the solution.

Although it is common to remove the solvent from the solution by evaporation, other techniques can be used. For example, the solvent may be adsorbed, absorbed, chemically or physically bound, solidified, reacted away, membrane separated or otherwise removed from the solutes. In any case, however, solvent removal should be such that an intimate mixture of the silicon carbide precursor and the carbon precursor remains.

When the solvent is removed by vaporization, it is preferred that the solution is carefully heated to vaporize the solvent without foaming. The vaporization is continued until all of the solvent has been removed. The resulting intimate mixture of the silicon carbide precursor and the carbon precursor can then be processed to the subject carbon composite, or can be contacted with carbon fibers so that the fibers are coated with the mixture. If a fiber bundle is used, then the solid mixture is used to impregnate all of the interstices of the bundle.

In cases where it is desirable to control the amount of the carbon composite that is associated with a particular amount of carbon fibers, the amount of composite per unit amount of fibers can be controlled either by controlling the concentrations of the silicon carbide precursor and the carbon precursor in the solvent solution, and/or by controlling the amount of the solution that is allowed to remain in association with the fibers before the solvent is removed. The amount of solution that remains with the fibers can be controlled by running the impregnated fiber through neap rolls, or squeeze rolls, prior to removing the solvent.

The impregnated fiber bundle is then hot-pressed at a temperature of between about 100° C. to about 600° C., and preferably between about 200° C. and about 400° C., for from about 0.5 hrs to about 5 hrs, and preferably from about 1 hr to about 2 hrs, at a pressure of from about 200 psig to about 2000 psig, preferably from about 800 psig to about 1200 psig, to mold the mixture and the carbon fibers into a desired form. This form can be the desired form of a finished part, or it can be any other form, such as a sheet, thread, bar, rod, or block from which a final part can be machined.

An alternative embodiment of the subject method is to impregnate the carbon fibers, or fiber bundle, with the silicon carbide precursor/carbon precursor liquid solution. The silicon carbide precursor and carbon precursor solution is prepared in a solvent as described above. However, the carbon fibers are coated with the liquid solution prior to desolventizing. The solvent is then removed from impregnated fibers as described above and the dried, impregnated fibers are then hot pressed.

The pressed fiber/precursor bundle (which may also be termed the "green" composite, or "prepreg") is then pyrolyzed to obtain the carbon composite of the present invention. Such pyrolysis can also be termed "carbonization", herein. The pyrolysis is generally carried out by raising the temperature of the green composite to at least about 800° C., or until the weight of the green composite is substantially unchanging, while holding the green composite in an inert atmosphere. The inert atmosphere can be supplied by nitrogen, argon, helium, neon, any mixture thereof, or any other gas that does not react with any component of the green composite or with itself. It is preferred that the pyrolysis be carried out by steadily increasing the temperature of the green composite from ambient up to the maximum temperature of pyrolysis over some period of time and then cooling the composite back to ambient temperature, while maintaining the inert atmosphere. The heating period can be almost any time, but a heating period of from 30 minutes to one hour is typical. The maximum temperature is preferably from about 800° C. to about 1400° C., more preferably about 1000° C. to about 1250° C., and even more preferably about 1100° C. to about 1200° C.

After pyrolysis is complete, the subject composite is cooled to room temperature and is ready for use, or for fabrication into a desired final form. If it is desirable, the pyrolyzed composite can optionally be infiltrated with silicon carbide to increase the density of the finished composite to the desired level. This infiltration is known in the art and further information can be found in the *Handbook of Composites*, 2nd Ed., S. T. Peters, Ed., Chapman and Hall, London, UK, (1998), and in *Essentials of carbon-carbon composites*, T. R. Thomas, Ed., Royal Society of Chemistry, Cambridge, UK, (1993).

An advantage of the subject method is that it is less complex and potentially less costly than known alternatives such as multilayer coating, or boron inhibitor inclusion since fewer processing steps are involved. Moreover, the method produces a carbon composite material that possesses several advantages over presently known carbon composites. These advantages will be described below.

The carbon composite of the present invention is surprisingly resistant to oxidation. This property can be explained with reference to FIG. 1, where the results of thermogravimetric analysis (TGA) of PCS, pitch and two composites of PCS and pitch that were prepared according to the method of the present invention are shown. During that period of the TGA test in which the samples were exposed to oxygen while temperature was increased, it can be seen that pitch was totally oxidized at a temperature of somewhat over 900° C., while a 20/80 by weight PCS/pitch composite had lost less than one-half of its original weight and a 50/50 by weight PCS/pitch composite experienced essentially no weight loss during the oxidation test. This showed that the oxidation resistance of the subject composite is a function of the ratio of silicon carbide/carbon matrix, and illustrated the surprising additional advantage of being able to select the desired level of oxidation resistance by varying the level of the silicon carbide/carbon matrix ratio in the subject composite.

A further advantageous property of the subject composition is that the carbon matrix is uniformly protected against oxidation throughout its bulk rather than just at its surface. It is believed that this property is due to the uniform distribution of the nanocrystalline silicon carbide regions throughout the bulk of the carbon matrix. Thus, surface cracks and other imperfections do not open unprotected regions of the composite to oxidative attack as they do in the case of composites having protective surface coatings.

A further advantage of the novel composite is that its mechanical properties, such as tensile and compressive strength, are not significantly reduced by the presence of the nanocrystalline silicon carbide regions in the carbon matrix. In some cases, the strength is even enhanced. Moreover, the novel composite is less prone to develop cracking due to thermal stress than are, for examples, composite materials that include silicon carbide polycrystalline regions or large crystals with definite and abrupt interfaces with the carbon matrix.

The subject composite can be used anywhere a carbon composite material can be used. Parts can be molded or machined from the subject composite for use in vehicles and engines. When the word "part" is used herein in reference to potential applications of the subject composite, what is meant is an article of manufacture that contains the subject composite. By way of example, such articles as brake shoes and brake pads, pistons, piston rods, engine valves, engine blocks and other automotive and engine components can be fabricated from the subject composite. Furthermore, airframe structures and airframe coverings can be advantageously fabricated from the subject composite.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

This example illustrates the preparation of nanocrystalline silicon carbide-doped carbon composite matrices of the present invention.

A sample of the novel carbon composite having a 50/50 weight ratio of silicon carbide precursor/carbon precursor was prepared. Polycarbosilane ( PCS; 50 grams, obtained from the Dow Corning Company "catalog reference "X-9-6348"), isotropic pitch (50 grams, type A70, obtained from the Amoco Company) were added to toluene (200 ml) in a glass 500 ml beaker fitted with a top-entering turbine-type agitator and with constant agitation at moderate speed. The temperature of the material in the beaker was controlled at 80° C. and the beaker contents were mixed for about 30 minutes, or until the PCS and the pitch were completely dissolved in the toluene. When the PCS and pitch were completely dissolved, a spool of P25 carbon fibers, containing about 50 g of fibers; (obtained from the Amoco Company, was immersed into the solution for a few minutes (approximately 5–30 min.), or until the solution had thoroughly penetrated the spool of fibers. The spool of impregnated carbon fibers was then removed from the solution and excess amounts of the solution were removed from the spool by evaporation in a tube furnace set at a temperature of 120° C. The resulting dried, impregnated carbon fibers were then referred to as a "prepreg".

The dried, impregnated carbon fibers were then chopped and hand-laid into a mold and hot-pressed between 200° C. and 400° C. using a Carver press for 1 to 2 hours, and at a pressure of 500 to 1,000 psi. It was noticed that the change in the temperature during the pressing step was dependent upon the weight ratio of silicon carbide precursor/carbon precursor. As the ratio of silicon carbon precursor/carbon precursor decreased (as the amount of the carbon precursor increased), the temperature and time had to be increased.

Figure 1:
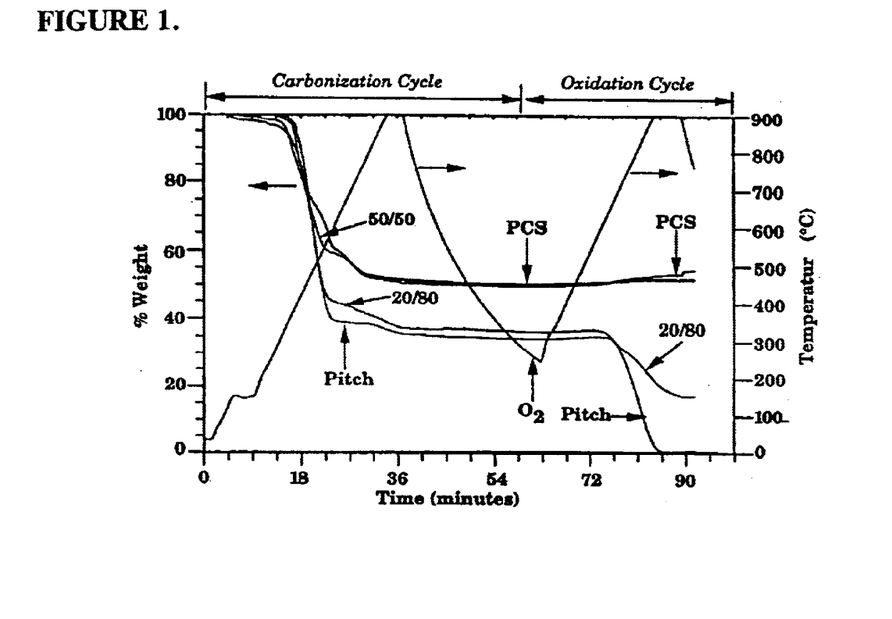
FIG. 1 is a plot of sample weight of petroleum pitch (Pitch); polycarbosilane (PCS); a 20/80 by weight PCS-pitch composite according to the present invention (20/80); and a 50/50 by weight PCS/pitch composite according to the present invention (50/50); and temperature versus time during a thermogravimetric analysis destructive test; the carbonization and oxidation parts of the test are shown at the top of the figure.

After the material was removed from the press, it was carbonized in a helium atmosphere in a box furnace according to a temperature profile similar to that shown in FIG. 1 at temperatures up to about 800° C. After the maximum carbonization temperature had been reached, the material was cooled to room temperature. The entire carbonization cycle was completed within about 60 minutes. Another carbon composite material was made up with the same method described above, except that the weight ratio of PCS/pitch in the initial solution was set at 20/80, rather than 50/50, as described above. The same concentration of solids in the toluene solvent was maintained in the 20/80 sample as for the 50/50 ratio sample.

Samples of pure PCS and pure pitch were also carbonized under the same conditions for comparison purposes.

Characterization

Samples of the nanocrystalline silicon carbide carbon composite having 20/80 and 50/50 PCS/pitch weight ratios, along with the samples prepared from pure PCS and pure pitch, were analyzed by transmission electron micrography (TEM) and optical microscopy; by thermogravimetric-Fourier transform infrared spectrophotometry for weight loss and methane evolution during carbonization; and by thermogravimetric analysis in an oxygen atmosphere for resistance to oxidation at high temperatures.

Figure 3:
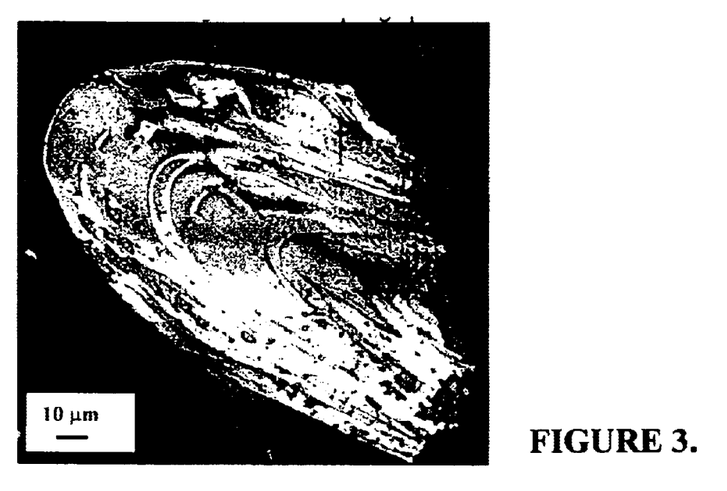
FIG. 3 is an optical photomicrographic image of a cross-section of beta pitch that had been pyrolized at up to 800° C. and that shows one aspect of isochromatic bands and lines that change in intensity upon turning of the microscope stage, thus indicating that the structure of the material is anisotropic in nature (i.e., is pregraphitic)

The samples of PCS/pitch, pure PCS and pure pitch were found to have different structures after carbonization. Pitch, which was originally isotropic, lost its heteroatoms and left a carbon skeleton behind. The carbon skeleton is made up of elemental polyaromatic units defined as basic structural units (BSU) similar to di-coronene. The BSUs are associated edge-to-edge roughly parallel to a preferred orientation plane and inside homogeneously oriented volumes (local molecular orientations, LMO). At 350° C., the formation of Brooks and Taylor spheres occurs (See, *Carbon*, 3:185 (1965), for more information about the formation and properties of Brooks and Taylor spheres). During pyrolysis, these spheres grow, coalesce, and finally form a mosaic, or brittle solid. After carbonization at above about 800° C., the material is solid and entirely anisotropic (e.g., see the isochromic lines and bands shown in the optical micrograph of FIG. 3, where the color (in a color image), or the grey scale of the isochromic bands and lines (of a black and white image) change upon rotation of the sample under the microscope and therefore indicate the magnitude of the pregraphitic ordering of the sample. In contrast, PCS remained amorphous after carbonization.

Figure 4:
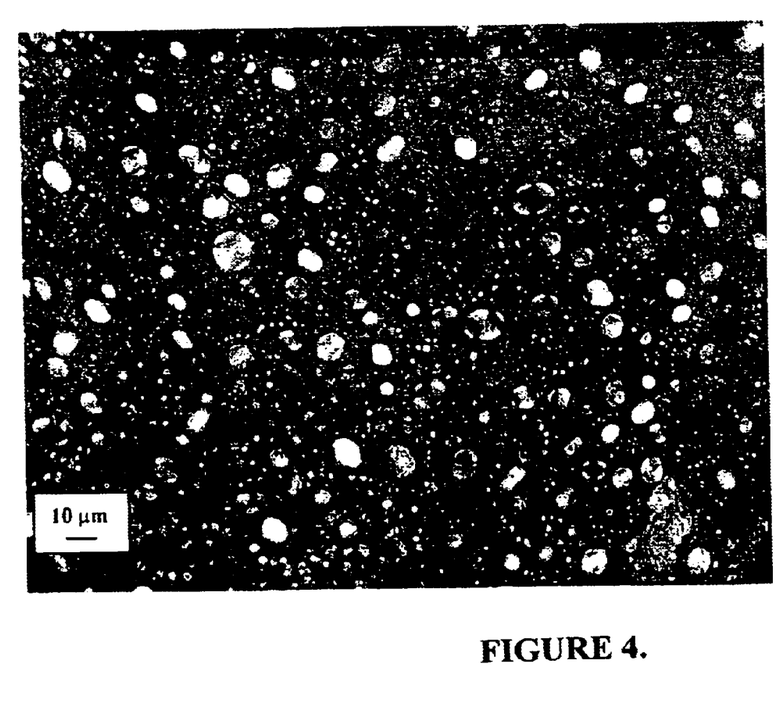
FIG. 4 is an optical photomicrographic image of a cross-section of a pyrolized 30/70 by weight PCS/pitch mixture showing a reduction in development and coalescense of Brooks and Taylor spheres compared with a sample that is free of PCS.

The 30/70 weight ratio PCS/pitch mixture is also isotropic prior to carbonization, but becomes partially anisotropic after carbonization at about 800° C. However, a small part of the material remains isotropic. The optical micrograph that is shown in FIG. 4 shows regular and deformed anisotropic spheres with glistening areas on the surface of the spheres (see, e.g., the structures pointed out by the single arrows in the figure). Normally, no such glistening areas are observed in carbon anisotropic spheres. This difference is thought to be due to the presence of the silicon carbide as an amorphous or nanocrystalline phase. The deformation of the spheres is believed to be due to a convective flow created during the carbonization process.

FIG. 2 shows a high resolution transmission electron micrograph (TEM) image of a thin section of a nanocrystalline silicon carbide carbon composite that resulted from an initial PCS/pitch weight ratio of 30/70. The TEM image was obtained using lattice fringes mode (LF 002), which permits direct observation of the structural ordering of the phases of the composite. With this TEM mode, both the phase type and its relative degree of crystallinity can be differentiated. In FIG. 2, black lines that represent lattice fringes of both carbon and silicon carbide atomic layers appear on a white background. The parallel straight black lines (identified by the double arrow) correspond to a nanocrystalline silicon carbide region, while the discontinuous, irregularly-ordered black lines (identified by the single arrow) correspond to the amorphous, dangled aromatic carbon layers of the carbon phase that are typical of aromatic carbon layers. A smaller silicon carbide region (dark area) is seen upwards and to the right of the larger silicon carbide region, but the smaller region exhibits no crystalline property.

At the carbonization temperature used herein, most carbons behave similarly and provide a turbostratic structure. Since the present materials were not subjected to high carbonization temperatures (such as about 2000° C., for example) a regularly ordered carbon structure would not be expected. The micrograph leads the inventor to believe that some demixing of the PCS/pitch solution occurs during some stage of the production process, since an amorphous phase of carbon matrix is produced that is typical of pure pitch, and a partially crystalline silicon carbide region is produced that is typical of pure PCS. However, it can also be seen that there is no clear, or sharp, boundary between the crystalline silicon carbide region—and, in particular, the smaller silicon carbide region—and the amorphous carbon matrix region. Thus, it is believed that the mesophase formed in the petroleum pitch during pyrolysis acts as a crystallization agent in the nanoscale silicon carbide regions, while the silicon carbide source (PCS) plays the role of a crosslinking agent, similar to the role of oxygen in the stabilization process. The combination of PCS and pitch thus produce a synergistic affect that cannot be achieved by either alone.

EXAMPLE 2

This example shows the improved resistance to oxidation of the carbon-carbon composite of the present invention.

The oxidation resistance of nanocrystalline silicon carbide doped carbon samples produced from 50/50 weight ratio PCS/pitch and from 20/80 weight ratio PCSD pitch were measured by thermogravimetric analysis (TGA), involving measurement of the weight loss of a material during carbonization (heating in helium) and combustion (heating in an oxygen-containing atmosphere). The weight loss of pure pitch and pure PCS samples was also measured using the same method.

A sample of each test material was placed in a Cahn—Model TG 171 Thermogravimetric Analyzer and subjected to a pyrolysis ramp in a helium atmosphere up to about 900° C., followed by a cool-down period and a combustion ramp up to about 900° C. The introduction of oxygen into the test chamber is indicated in the figure. The combustion period was also followed by a cool-down. The resulting weight loss for each of the four test materials during the period of pyrolysis (carbonization) and combustion (oxidation) is shown in FIG. 1. The pitch experienced a weight loss during carbonization of about 65%, and was totally destroyed during the combustion phase. The pure PCS and the 50/50 PCS/pitch mixture each lost about 50% of its initial weight during carbonization, but experienced no further weight loss during combustion—indicating that no oxidation took place. In the case of the 50/50 PCS/pitch mixture, more carbon remained in the carbonized char than would have been predicted from a simple proportionality. In other words, carbon was preferentially retained in the char of the 50/50 mixture.

The 20/80 PCS/pitch mixture lost about 63% of its weight during carbonization and a further 20% during combustion—indicating that some level of oxidation took place, but less than experienced with pure pitch. It was also shown that a 30/70 PCS/pitch mixture, like the 50/50 mixture, had no weight loss upon combustion. Thus, it was apparent that the degree of oxidation resistance of the carbonized materials was directly related to the weight ratio of the silicon carbide precursor to the carbon precursor in the pre-carbonization mixture, but that at some level of the ratio the carbonized material was substantially completely protected against oxidation, at least under the conditions of the test.

In a separate test, a 30/70 PCS/pitch mixture showed no apparent oxidation during heating at 1400° C. for 5 hours in an oxygen atmosphere.

Figure 5:
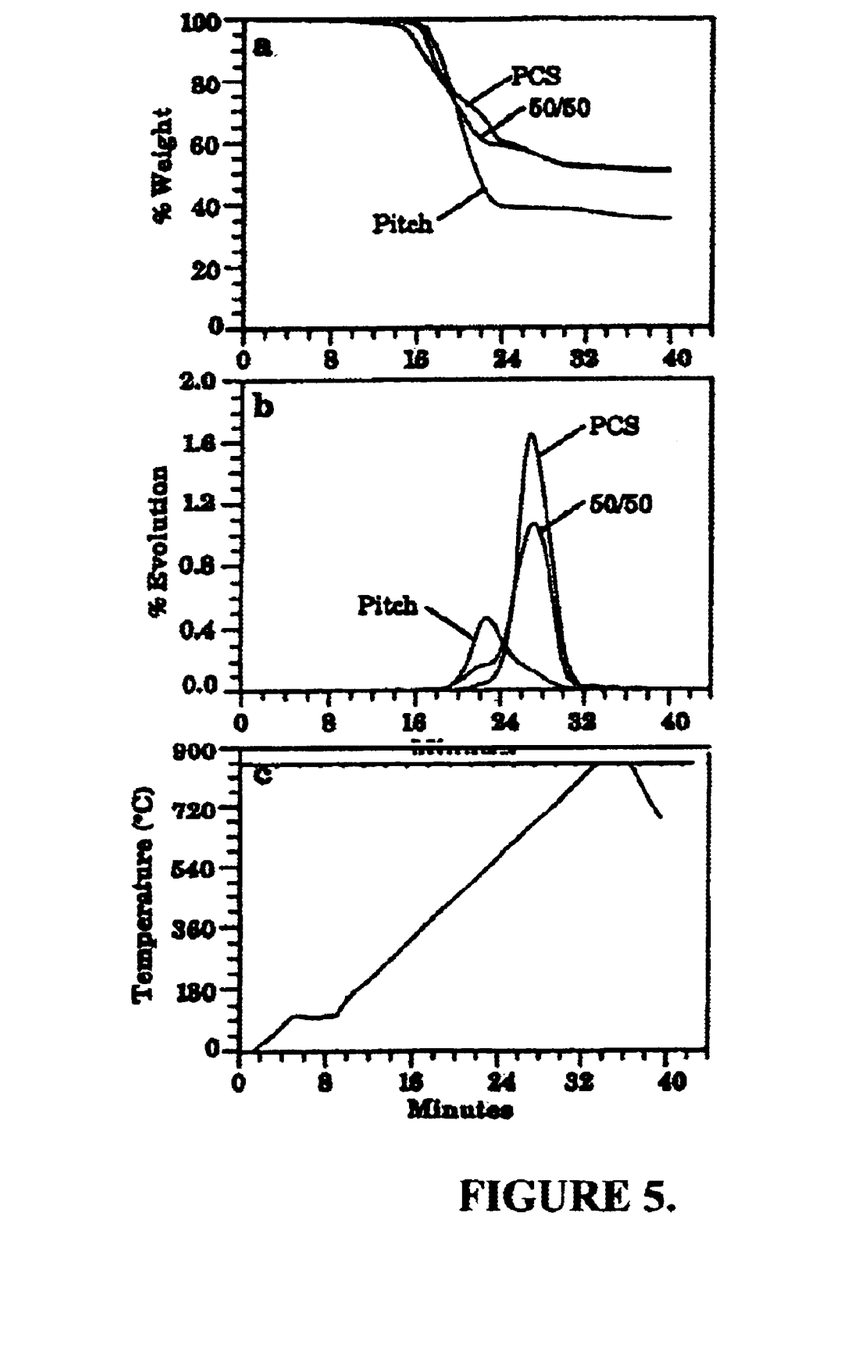
FIG. 5 shows the results of thermogravimetric analysis of samples of pure pitch (Pitch), pure polycarbosilane (PCS) and a 50/50 by weight mixture of PCS/pitch (50/50) under conditions typical of pyrolysis, where (a) shows the weight loss as a function of time for the three materials; (b) shows the respective amounts of methane evolution as measured by Fourier transform infrared spectrophotometry; and (c) shows the temperature as a function of time of the materials in the thermogravimetric analyzer.

Weight loss and methane evolution were measured for pure pitch, pure PCS and a 50/50 PCS/pitch mixture during a carbonization cycle as shown in FIG. 5. The weight loss results closely track the data shown in the carbonization section of FIG. 1, and the methane evolution varies inversely with weight loss.

Figure 6:
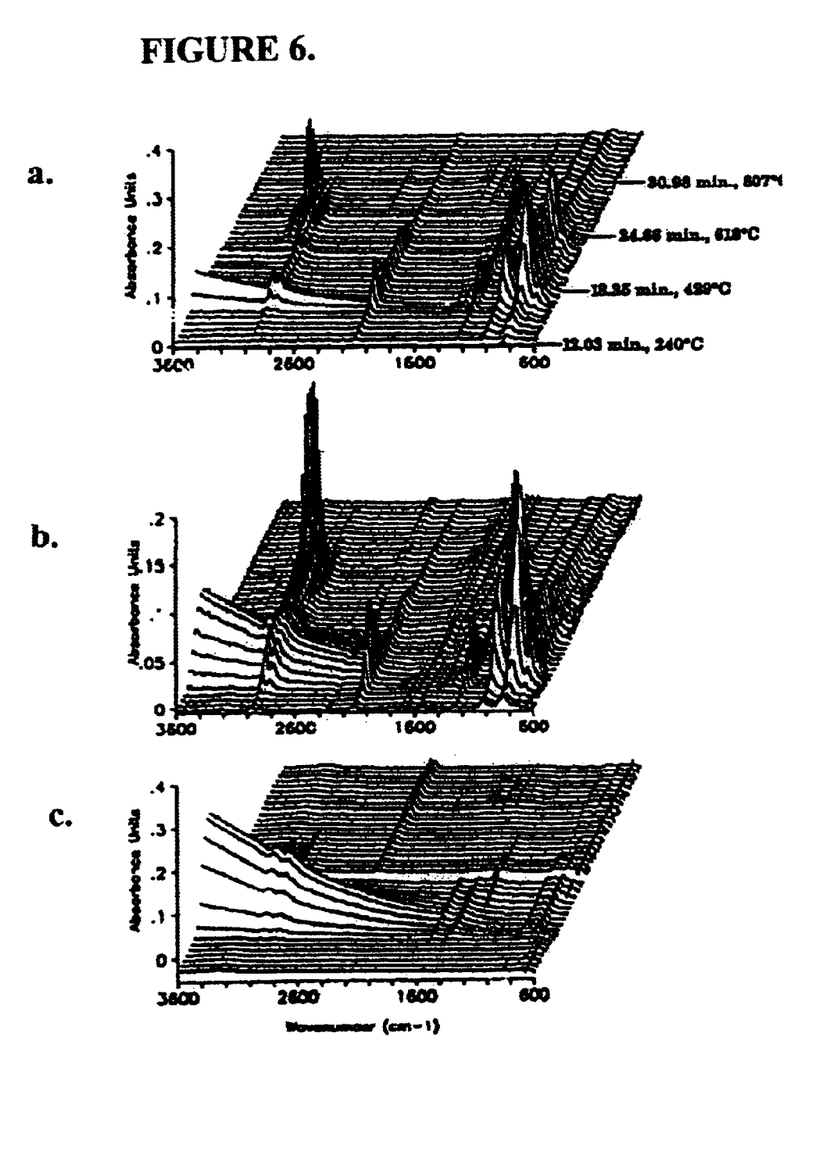
FIG. 6 shows Fourier transform infrared absorbance spectra of the gases evolved during carbonization as a function of the time and temperature for (a) polycarbosilane; (b) a 50/50 by weight mixture of PCS/pitch; and (c) beta pitch.
Figure 7:
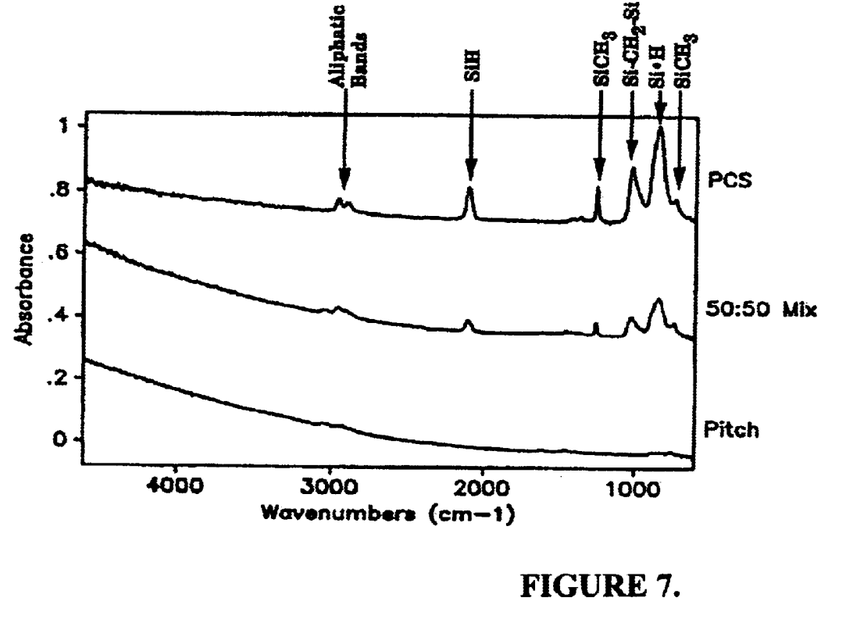
FIG. 7 shows the Fourier transform infrared absorbance spectra and the identification of gases evolved during carbonization at 430° C. for polycarbosilane (PCS), 50/50 by weight mixture of PCS/pitch (50/50 Mix), and beta pitch (Pitch)

In FIG. 6, the FT-IR gas absorption spectra of the gasses evolving from pure pitch, pure PCS and a 50/50 PCS/pitch mixture during carbonization are shown as a function of time and temperature. FIG. 7 shows one segment of the same date; namely, the FT-IR absorbance spectra of the gases generated from the three test materials at a temperature of 430° C., with the evolving gasses identified.

EXAMPLE 3

This example illustrates the testing of the coefficient of friction of a nanocrystalline silicon carbide doped carbon composite according to the present invention.

Figure 8:
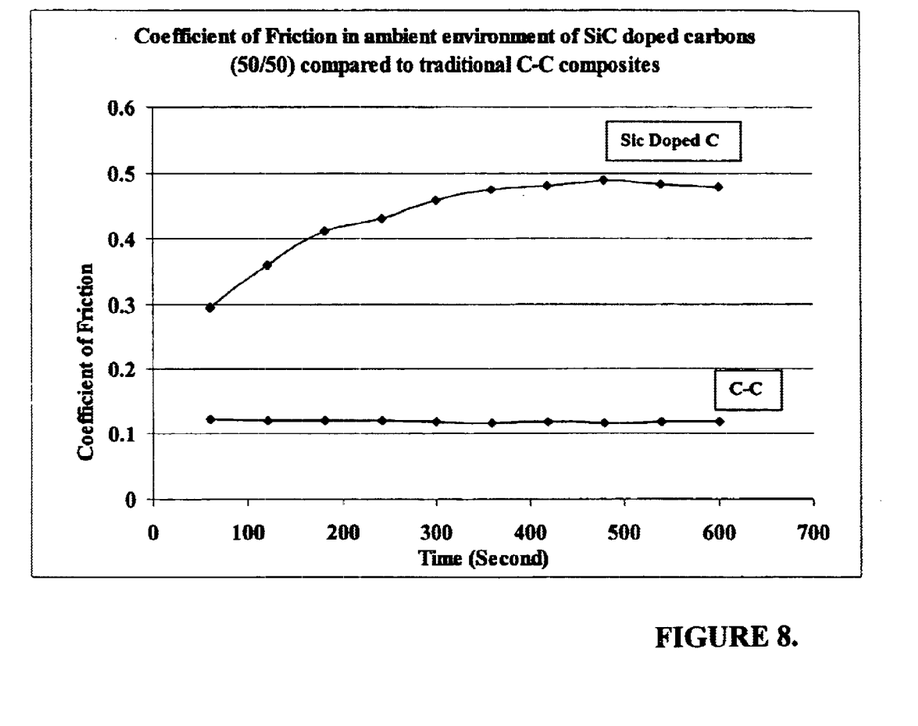
FIG. 8 is a graph showing the variation over time of the coefficient of friction in air at 50% relative humidity of a carbon composite material that was free of silicon carbide (C—C) and a carbon composite material according to an embodiment of the present invention that comprised the nanocrystalline silicon carbide-doped carbon composite (Sic Doped C) that resulted from pyrolysis of a 50/50 PCS/pitch mixture.

Samples of pyrolized pure pitch and a nanocrystalline silicon carbide doped carbon composite material comprising a 50/50 blend of PCS and pitch were prepared as described in Example 1. A sample of each material was formed into the shape of a small brake disc. The coefficient of friction of each of the samples was measured at ambient temperature and relative humidity in a UMT-universal micro tribometer as a function of time. The results, shown in FIG. 8, show that the inclusion of nanocrystalline silicon carbide results in a significantly increased coefficient of friction over the composite material without the silicon carbide. This test indicates that even at environmental conditions where the relative humidity was about 50%, the novel material retained a much higher coefficient of friction than the carbon-carbon composite materials used currently in commercial aircraft. It is believed, therefore, that the novel materials may offer substantial advantages when used in friction braking systems of automobiles, trucks, airplanes and other vehicles. These materials should maintain better braking performance than conventional carbon composites when used in friction brakes even under moist environmental conditions.

All references, including without limitation all papers, publications, presentations, texts, reports, manuscripts, brochures, internet postings, journal articles, periodicals, and the like, cited in this specification are hereby incorporated by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results attained.

As various changes could be made in the above methods and compositions without departing from the scope of the invention, it is intended that all matter contained in the above description [and shown in the accompanying drawings] shall be interpreted as illustrative and not in a limiting sense.

What is claimed is:

1. A method for preparing an oxidation resistant carbon composite material comprising forming a solids-free solution of a silicon carbide precursor and a carbon precursor in a solvent; removing the solvent; and pyrolyzing the material remaining after removing the solvent, thereby forming nanocrystalline silicon carbide in a carbon matrix.

2. A method for preparing an oxidation resistant carbon composite material comprising intermixing in a solvent a silicon carbide precursor and a carbon precursor and forming a solution that is free of solids; removing the solvent; and pyrolyzing the material remaining after removal of the solvent, thereby forming nanocrystalline silicon carbide in a carbon matrix.

3. The method of claim 1, wherein the solvent is a material in which both the silicon carbide precursor and the carbon precursor are soluble.

4. The method of claim 3, wherein the step of forming a solution that is free of solids comprises filtering the mixture.

5. The method of claim 4, wherein filtering comprises passing the solution through a 20 micron filter.

6. The method of claim 5, wherein filtering comprises passing the solution through a 10 micron filter.

7. The method of claim 3, wherein the solvent is removed by evaporation, solidification, reaction, binding, or adsorption.

8. The method of claim 7, wherein the solvent is removed by evaporation.

9. The method of claim 3, wherein pyrolyzing is carried out at a temperature of about 800° C. to about 1400° C.

10. The method of claim 9, wherein pyrolyzing is carried out at a temperature of about 1000° C. to about 1250° C.

11. The method of claim 10, wherein pyrolyzing is carried out at a temperature of about 1100° C. to about 1200° C.

12. The method of claim 9, wherein the silicon carbide that is formed during pyrolysis is nanocrystalline silicon.

13. The method of claim 9, wherein the silicon carbide that is formed during pyrolysis comprises predominantly single crystals of silicon carbide.

14. The method of claim 3, wherein the method further comprises contacting the material remaining after removal of the solvent with carbon fibers prior to pyrolyzing the material.

15. The method of claim 3, wherein the method further comprises contacting the solution with carbon fibers prior to removing the solvent.

16. The method of claim 14, wherein the method further comprises pressing the material remaining after removal of the solvent into a desired shape prior to pyrolyzing the material.

17. The method of claim 15, wherein the method further comprises pressing the material remaining after removal of the solvent into a desired shape prior to pyrolyzing the material.

18. The method of claim 3, wherein the carbon precursor is selected from the group consisting of isotropic pitch, mesophase pitch, mesogenic pitch, coal tar pitch, furans, phenolics, polyimides, polybenzimidazole, polyphenylene, biphenolic resins, novolac, novax, polyacrylonitrile, polyacetanaphthalene, polydecacylene, quinoline insoluble fractions of petroleum, toluene insoluble fractions of petroleum, and beta resins obtained according to ASTM D-5294.

19. The method of claim 18, wherein the carbon precursor is petroleum pitch.

20. The method of claim 18, wherein the silicon carbide precursor is a silicon containing organic polymer.

21. The method of claim 20, wherein the silicon carbide precursor is polycarbosilane.

22. The method of claim 20, wherein the solvent is selected from an organic solvent having a solubility parameter between 8.0 and 11.0 Hildebrand units and a normal boiling point of less than 345° C.

23. The method of claim 22, wherein the solvent is selected from an organic solvent having a solubility parameter between 8.0 and 11.0 Hildebrand units and a normal boiling point of less than 240° C.

24. The method of claim 23, wherein the solvent is selected from an organic solvent having a solubility parameter between 8.0 and 11.0 Hildebrand units and a normal boiling point of less than 150° C.

25. The method of claim 24, wherein the solvent is selected from an organic solvent having a solubility parameter between 8.0 and 9.5 Hildebrand units and a normal boiling point of less than 150° C.

26. The method of claim 22, wherein the solvent is selected from benzene, toluene, pyridine, xylene, anthracene or quinoline.

27. The method of claim 21, wherein the solvent is toluene.

28. The method of claim 22, wherein the solvent is a component of the carbon precursor.

29. The method of claim 3, wherein the relative amounts of the silicon carbide precursor and the carbon precursor are sufficient to result in a composite material after pyrolysis having a silicon carbide-to-carbon matrix weight ratio of less than 60/40.

30. The method of claim 29, wherein the relative amounts of the silicon carbide precursor and the carbon precursor are sufficient to result in a composite material after pyrolysis having a silicon carbide-to-carbon matrix weight ratio of less than 50/50.

31. The method of claim 30, wherein the relative amounts of the silicon carbide precursor and the carbon precursor are sufficient to result in a composite material after pyrolysis having a silicon carbide-to-carbon matrix weight ratio of between about 25/75 and 50/50.

32. The method of claim 31, wherein the relative amounts of the silicon carbide precursor and the carbon precursor are sufficient to result in a composite material after pyrolysis having a silicon carbide-to-carbon matrix weight ratio of between about 33/67 and 43/57.

33. The method of claim 32, wherein the relative amounts of the silicon carbide precursor and the carbon precursor are sufficient to result in a composite material after pyrolysis having a silicon carbide-to-carbon matrix weight ratio of between about 35/65 and 40/60.

34. An oxidation resistant carbon composite material that has been prepared by the method of claim 1.

* * * * *